Nov. 23, 1943.   E. WENANDER   2,335,093
OIL OR GAS FIRED COOKING RANGE
Filed Feb. 23, 1940   3 Sheets-Sheet 3

Inventor,
E. Wenander
by: Glascock Downing & Siebold
Attys.

Patented Nov. 23, 1943

2,335,093

UNITED STATES PATENT OFFICE 2,335,093

OIL OR GAS FIRED COOKING RANGE

Erik Wenander, Lund, Sweden

Application February 23, 1940, Serial No. 320,500
In Sweden February 13, 1935

1 Claim. (Cl. 126—39)

The present invention relates to an oil or gas fired cooking-range with heat accumulators of metal, in which the combustion gases are utilized to heat also baking oven, warming cupboard and hot-water container. The invention is characterized by the fact that a channel for the combustion gases is provided in the accumulator, and that the accumulator is so insulated and fixed to the framework of the cooking-range that there will be a minimum of heat losses, all in order to obtain a maximum of heat at the points of utilization. According to the invention the accumulator is supported by stays fixed to the upper portion of the framework and extending from the lower portion of the accumulator as well as by stays extending from the upper portion of the accumulator and fixed to the lower framework of the cooking-range.

An oil fired cooking-range according to the invention is illustrated by way of example in the accompanying drawings.

Figure 1:
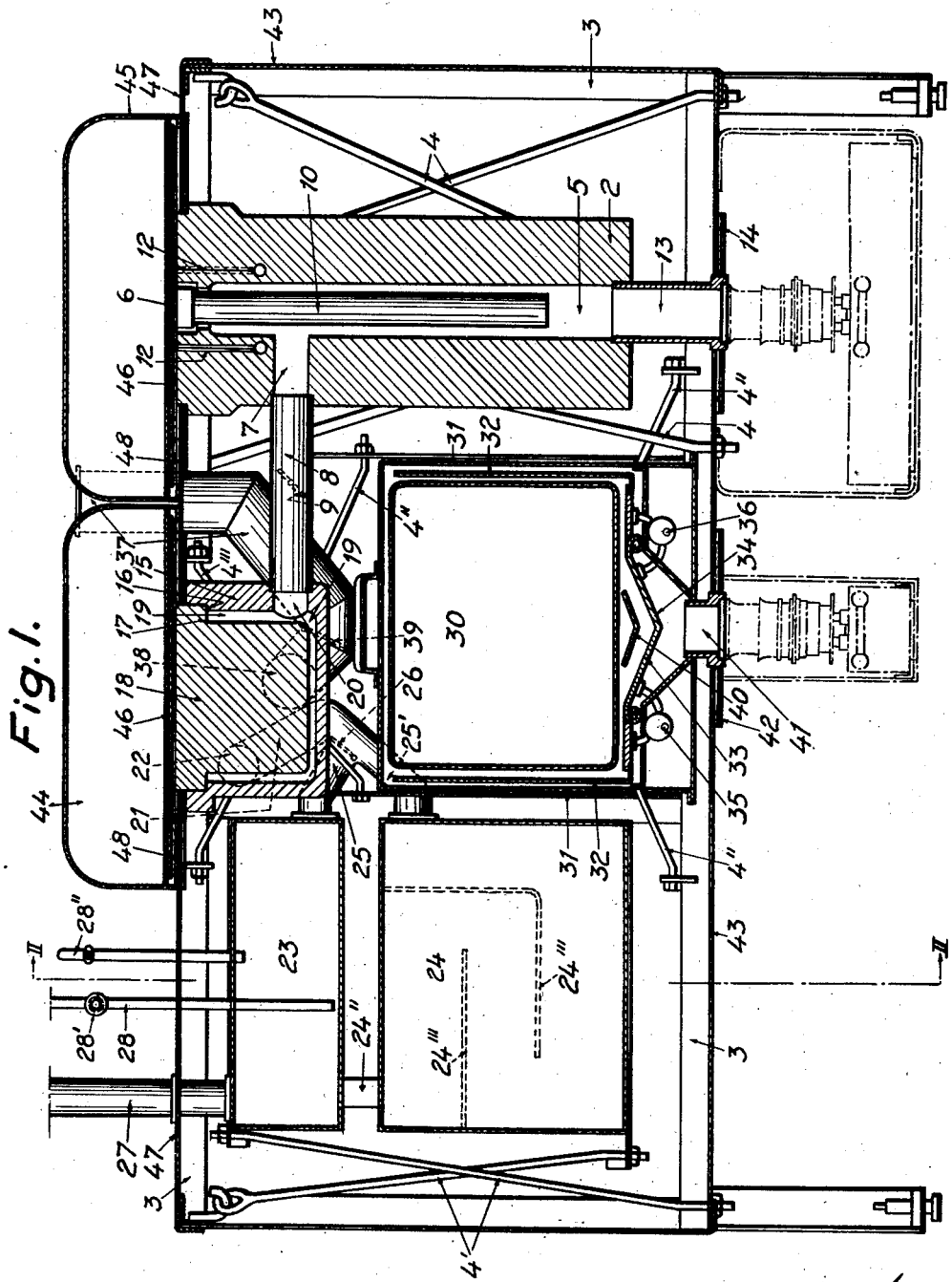
Fig. 1 is a vertical section on line I—I of Fig. 2.
Figure 2:
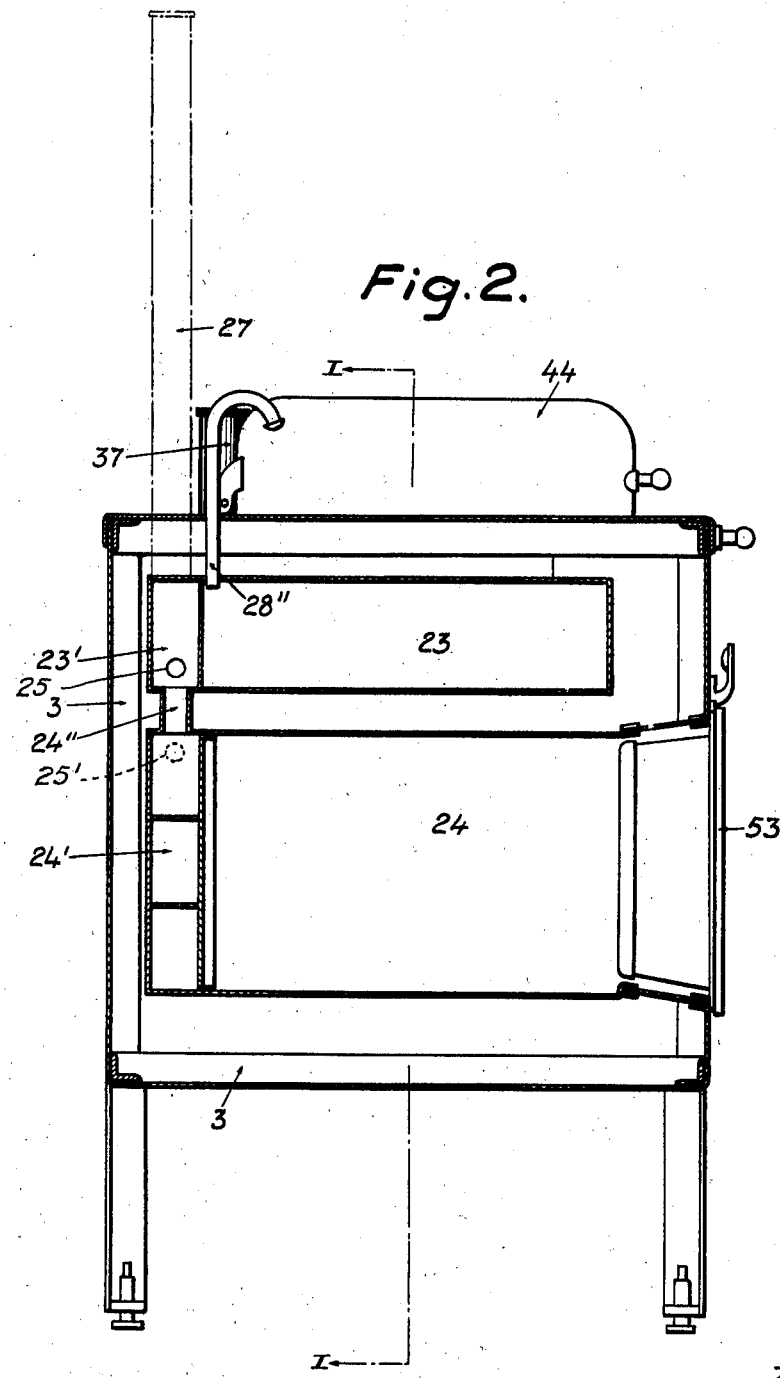
Fig. 2 is a vertical section on line II—II of Fig. 1.

2 indicates a high temperature accumulator which is suspended by diagonal stays 4 rigid with the framework 3 of the cooking-range in such a way the upper portion of the framework is connected to the lower portion of the accumulator and the lower portion of the framework with the upper portion of the accumulator. The high temperature accumulator is made of a solid cast iron piece, in which there is a vertical channel 5 extending from end to end for the passage of the combustion gases generated by an oil burner provided below the high temperature accumulator. In order to obtain the highest possible temperature the oil burner preferably consists of a wick burner burning with a blue flame. At the top the channel 5 is adapted to be closed by a cover 6 so that the gases may be prevented from directly escaping. In the upper portion of the high temperature accumulator there is a channel 7 communicating with the channel 5. The channel 7 is connected with a low temperature accumulator by a pipe 8, and the combustion gases leave through the channel 7 when the cover 6 closes the upper portion of the channel 5. In the pipe 8 there is provided a damper 9 so that the combustion gases through the pipe may be regulated. The accumulator should be relatively heavy in order to be able to accumulate as much heat as possible. However, this involves the drawback that the heating requires a very long time to make the cooking-range effective. To eliminate this drawback there is provided in the channel 5 a pipe 10 through which the combustion gases pass when the cover 6 closes the channel. In this way the gases are partly insulated from the cast iron mass so that a relatively great part of the generated heat is rapidly supplied to the vessel to be heated which is placed on a support 12 which may be regulated from the front of the cooking-range by the handle 11 and which is adapted to be raised and lowered. 13 indicates a pipe directing the combustion gases to the channel 5 from the source of heat. 14 is a guard plate.

The low temperature accumulator consists of an outer bowlshaped part 15 provided with a shoulder 16 upon which rests a shoulder 17 of an inner solid cast iron core 18. The core 18 is so large and the shoulder 17 is so situated on the shoulder 16 of the bowlshaped part that an annular chamber 19 is formed which at the bottom communicates with the pipe 8 by an opening 20 in the bowlshaped part 15 and at the top communicates with a discharge pipe 21 by another opening 22 in the said bowlshaped part. Consequently, the combustion gases from the high temperature accumulator are forced to sweep the accumulator core 18 which is adapted to be raised so that it will be easy to clean the annular chamber 19. The bowlshaped part 15 is fixed to the framework 3 by diagonal stays 4'''.

The discharge pipe 21 is divided into two branches 25 and 25' communicating respectively with chamber 23' and 24' provided at the back of a hot-water container 23 and behind a warming cupboard 24 respectively. In the branch there is provided a damper 26 for directing the combustion gases to the branch tubes. The two chambers 23' and 24' communicate with one another by a channel 24 and the chamber 23' communicates by a pipe 27 with the chimney. To increase the length of travel of the gases in the chamber 24' a pair of baffles 24''' are provided therein. The hot-water container and the warming cupboard are connected with the framework by the stays 4'. The container is connected with the water-conduit by the intake pipe 28 in which is provided a cock 28'. Further, there is a pipe 28'' for drawing-off the heated water. The intake pipe 28 opens at the bottom of the container and the drawing-off pipe opens at the top of the container so that when water is supplied by opening the cock 28', said cold water raises the hot water and forces it through the draw-off pipe 28". Further, there is a cock 29 for flushing and cleaning the container.

In Fig. 1 the baking oven 30 is shown provided with a special source of heat. In the hollow space formed by an outer casing 31 and the baking oven there are provided guide plates 32 dividing each of the vertical hollow spaces surrounding the oven into two chambers or channels to which the combustion gases may be completely or partly directed by changing the positions of turnable plates 33 and 34 located below the baking oven by turning operating members 35 and 36. Each of the operating members 35 and 36 consists of a rotatable cam engaged between arms attached to the related plate 33 or 34 so that when the cam is turned, movement is imparted to the plate. The baking oven is also suspended by diagonal stays 4". The combustion gases leave through the pipe 37 direct to the chimney. Also, they may also be admitted into the annular chamber 19 in the low temperature accumulator by a pipe 38 opening into said annular chamber and communicating with the pipe 37. The combustion gases are directed selectively into the pipes 37 or 38 by a damper 39 pivoted at its upper edge at the connection between the pipes 37 and 38. The gases entering the annular chamber from the pipe 38 are then led through the pipe 21 past the warming cupboard 24 to the outtake pipe 27. 40 indicates a baffle plate. Above the source of heat there is the pipe 41 leading the gases to the hollow space around the baking oven. 42 indicates a guard plate.

43 indicates outer plates fixed to the framework. Between the accumulators, the baking oven and the hot-water container and between said members and the outer plates there are provided insulating layers of slag wool or some other suitable material. Due to the special suspension and insulation of the accumulators and the other members the outer heat losses will be very low. In order to insulate the accumulators, insulating covers 44, 45 are placed on the same. That side 46 of the covers which faces the accumulator is of asbestos or the like, the others are of sheet metal, and the hollow space between them is filled with slag wool. At the top the accumulators are insulated from the top plate 47 of the cooking-range by rings 48 of asbestos or the like.

For the cleaning (sweeping) of the oven there are provided suitable soot doors. 53 indicates a door for the warming cupboard.

Figure 3:
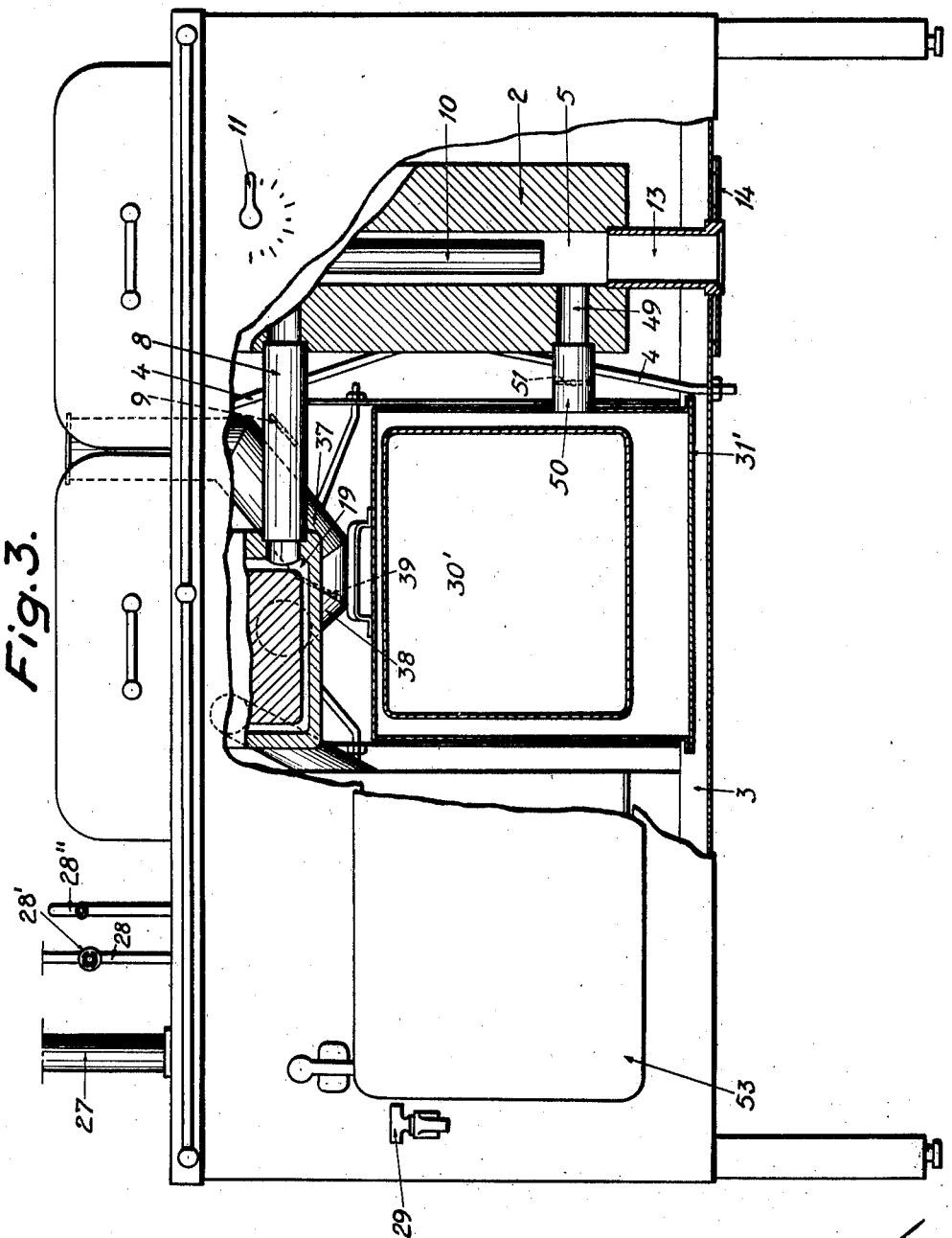
Fig. 3 is front view, partly in section, of a cooking-range, provided with a baking oven without special source of heat.

Fig. 3 shows a front view, partly in section, of a cooking-range having a baking oven 30' which is not provided with a special source of heat. In this case the combustion gases are supplied from the lower portion of the high temperature accumulator 2 through a channel 49 provided in the accumulator and communicating with the channel 5. The channel 49 communicates by a pipe 50 with the hollow space between the casing 31' and the oven 30'. In the pipe 50, there is a damper 51 so that the combustion gases may be led to the oven when said damper is open and the damper 9 in the pipe 8 and the cover 6 in the upper portion of the channel 5 are wholly or partly closed. Also in this case the combustion gases may be directed either direct to the chimney through the pipe 37, or they may be directed by the damper 39 through the pipe 38 to the annular chamber 19.

Having now described my invention, what I claim as new and desire to secure by Letters Patent is:

An oil or gas fired cooking range comprising a frame, a metallic high-temperature heat accumulator having a channel adapted to be transversed by combustion gases direct from a source of heat, a low temperature heat accumulator and a chamber surrounding the low temperature accumulator and connected with said channel, a warming chamber, a pipe connecting the chamber surrounding the second accumulator with the warming chamber, a cooking oven and a pipe connected with the lower portion of said channel for conducting combustion gases to the exterior of said oven, said high and low temperature accumulators and said warming chamber being arranged side by said and said cooking oven being arranged between the high-temperature accumulator and the warming chamber and below the low-temperature accumulator.

ERIK WENANDER.